United States Patent
Mas Rosique et al.

(10) Patent No.: US 8,175,038 B2
(45) Date of Patent: May 8, 2012

(54) METHOD AND APPARATUSES FOR INFLUENCING THE INVOKING OF A SERVICE PROVIDED BY AN APPLICATION SERVER TO A USER EQUIPMENT

(75) Inventors: Maria Luisa Mas Rosique, Madrid (ES); Nuria Esteban Vares, Aranjuez (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 321 days.

(21) Appl. No.: 12/666,759

(22) PCT Filed: Mar. 13, 2008

(86) PCT No.: PCT/IB2008/000587
§ 371 (c)(1),
(2), (4) Date: Dec. 24, 2009

(87) PCT Pub. No.: WO2009/001177
PCT Pub. Date: Dec. 31, 2008

(65) Prior Publication Data
US 2010/0189017 A1    Jul. 29, 2010

Related U.S. Application Data

(60) Provisional application No. 60/946,187, filed on Jun. 26, 2007.

(51) Int. Cl.
*H04Q 7/00* (2006.01)
*H04L 12/28* (2006.01)
(52) U.S. Cl. ........................ 370/328; 370/401
(58) Field of Classification Search ................ 370/254, 370/255, 328, 338, 400, 401
See application file for complete search history.

(56) References Cited

U.S. PATENT DOCUMENTS

| 7,561,535 | B2 * | 7/2009 | Naqvi et al. | 370/260 |
| 7,613,705 | B2 * | 11/2009 | Ayers et al. | 1/1 |
| 7,672,297 | B2 * | 3/2010 | Naqvi et al. | 370/352 |
| 7,684,323 | B2 * | 3/2010 | Tiainen | 370/230 |
| 7,773,983 | B2 * | 8/2010 | Takeda | 455/420 |
| 8,023,485 | B2 * | 9/2011 | Shi et al. | 370/338 |
| 2007/0088836 | A1 | 4/2007 | Tai et al. | |
| 2008/0240016 | A1 * | 10/2008 | Cai et al. | 370/328 |
| 2011/0164563 | A1 * | 7/2011 | Naqvi et al. | 370/328 |

OTHER PUBLICATIONS

International Search Report for PCT/IB2008/000587, mailed Nov. 13, 2008.

(Continued)

*Primary Examiner* — Hong Cho
(74) *Attorney, Agent, or Firm* — Nixon & Vanderhye P.C.

(57) ABSTRACT

A server and method are described herein that can influence the invoking of a service provided by an application server to a user-user equipment. The server includes a database that stores a service profile for the user-user equipment, where the service profile has a number of filter criteria wherein at least one includes: (1) a first trigger point and at least one first service point trigger that specifies one or more conditions which when satisfied will be downloaded to and checked by a remote control function before a service is invoked for the user-user equipment; and (2) a second trigger point and at least one second service point trigger that specifies one or more conditions which are checked against internally stored data associated with the user-user equipment and need to be satisfied before the service profile with the filter criteria including the first trigger point and the at least one first service point trigger is downloaded to and checked by the remote control function to invoke the service for the user-user equipment.

19 Claims, 8 Drawing Sheets

OTHER PUBLICATIONS

International Preliminary Report on Patentability with Amended Sheets for PCT/IB2008/000587, mailed Oct. 14, 2009.

European Search Report issued for European Application No. EP 11 15 3853, dated Apr. 11, 2011.

* cited by examiner

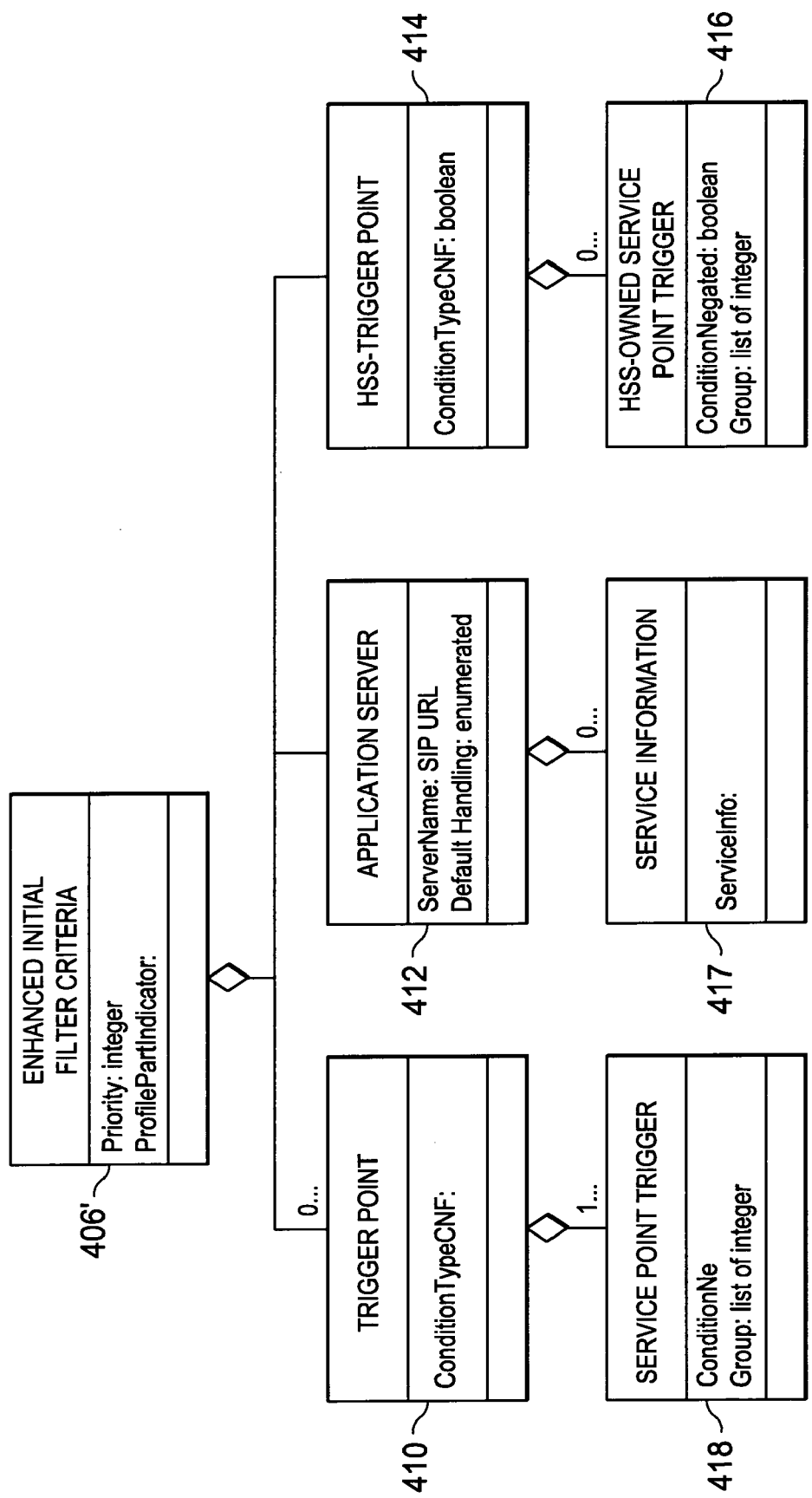

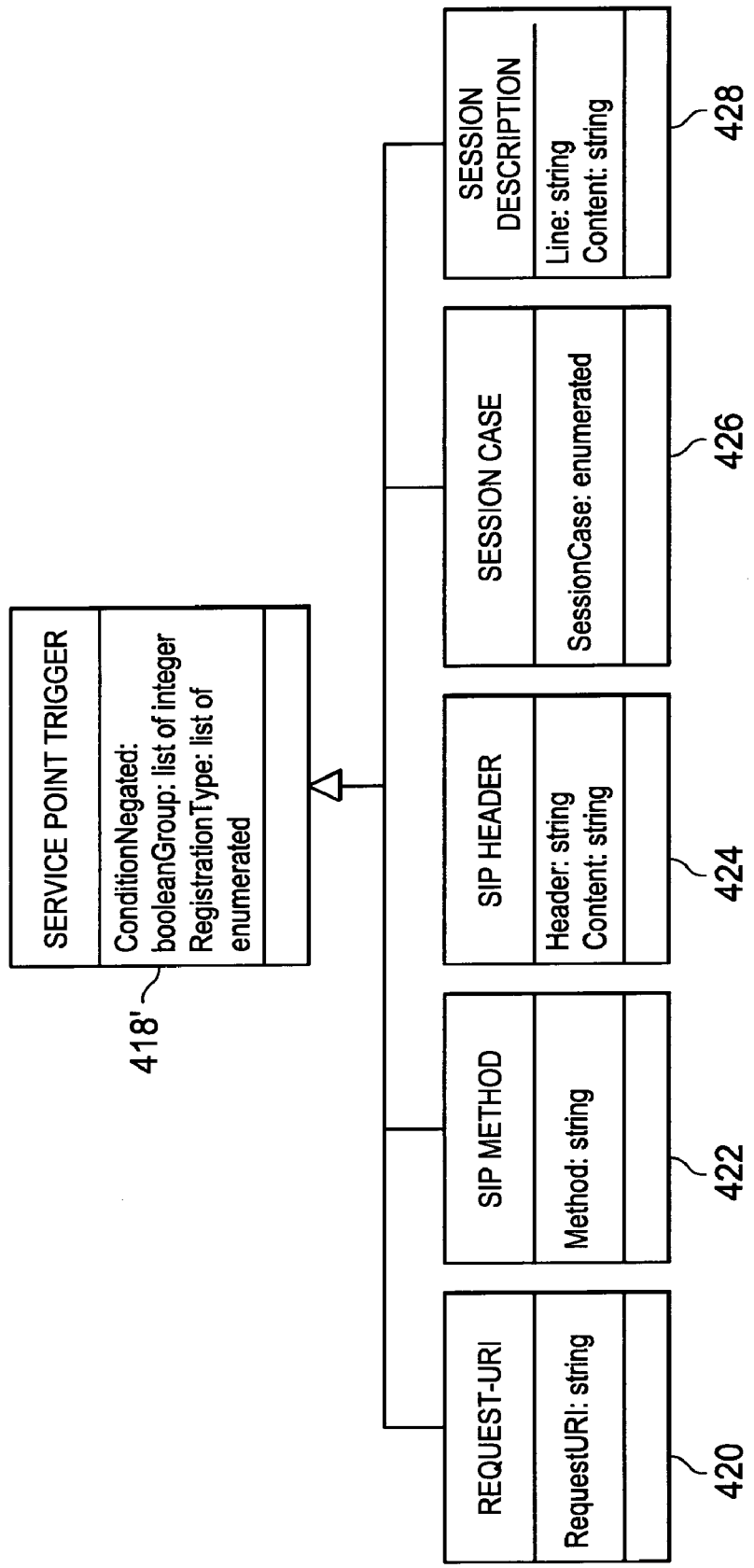

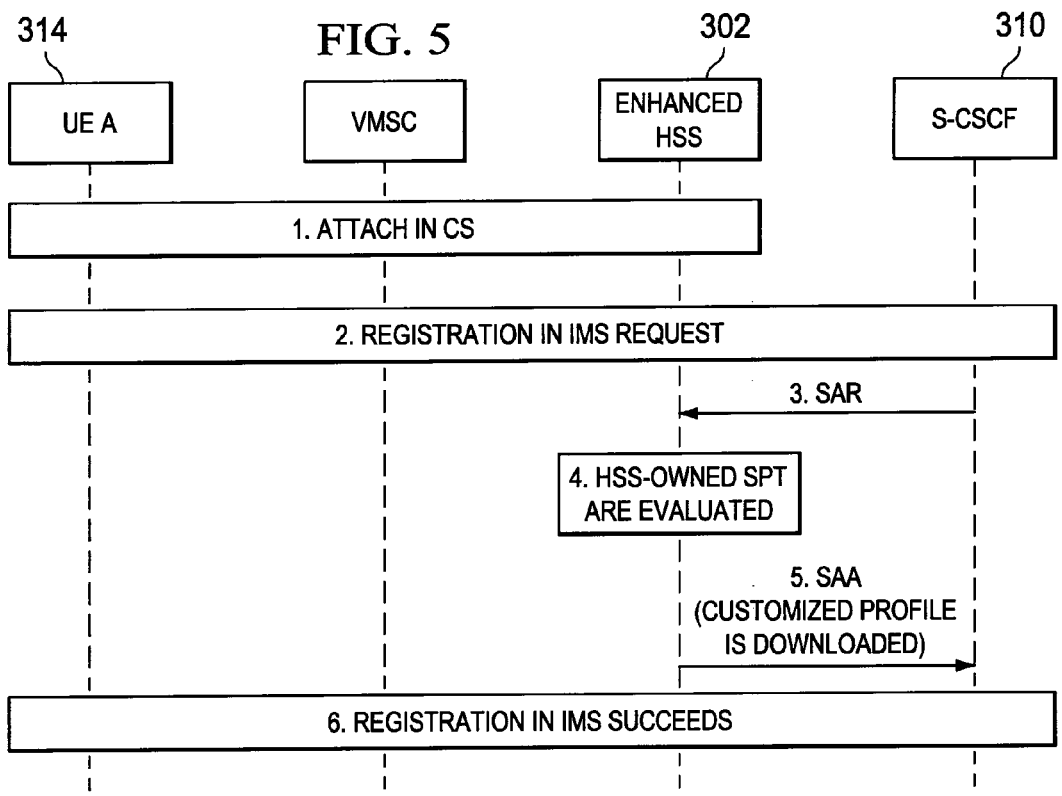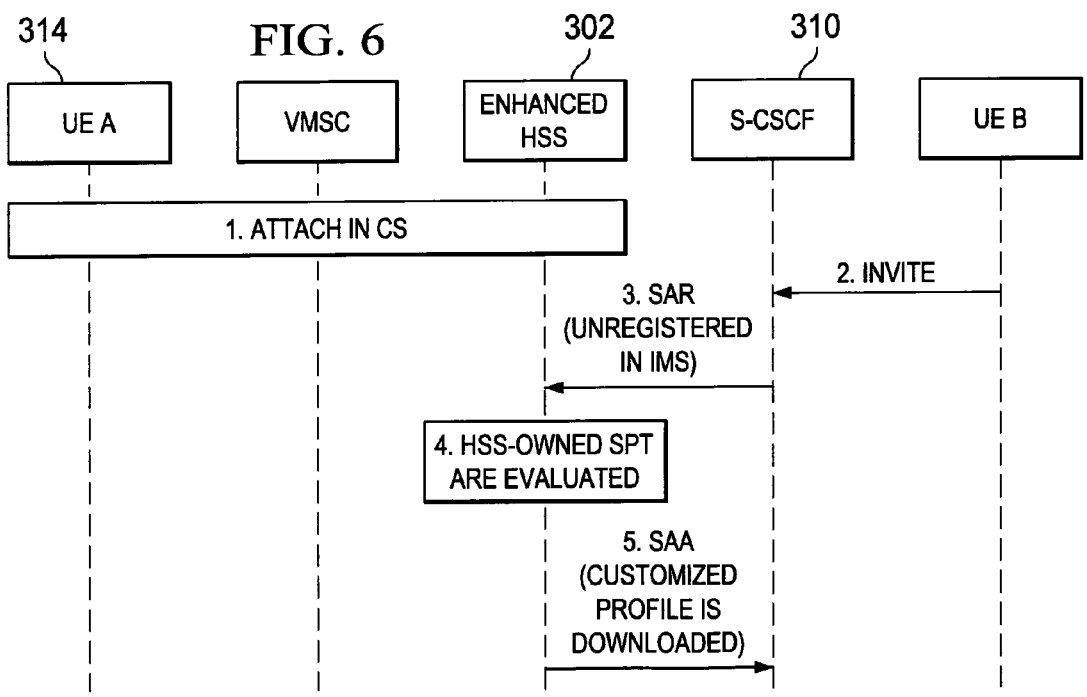

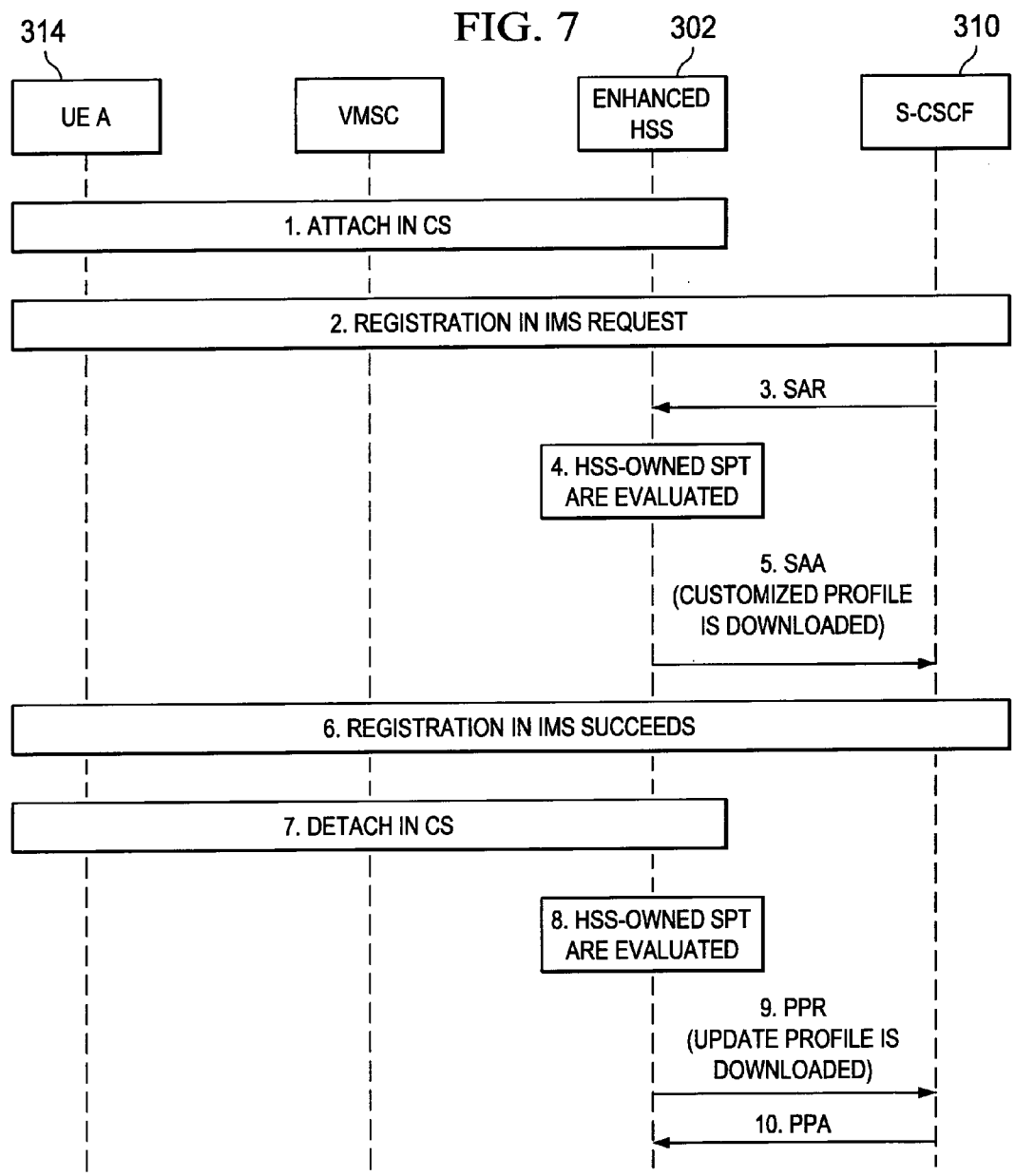

US 8,175,038 B2

METHOD AND APPARATUSES FOR INFLUENCING THE INVOKING OF A SERVICE PROVIDED BY AN APPLICATION SERVER TO A USER EQUIPMENT

CROSS REFERENCE TO RELATED APPLICATION

This application is the U.S. national phase of International Application No. PCT/IB2008/000587, filed 13 Mar. 2008, which designated the U.S. and claims the benefit of U.S. Provisional Patent Application No. 60/946,187 filed on Jun. 26, 2007 the contents of each of which are hereby incorporated by reference herein.

TECHNICAL FIELD

The present invention relates to the communications field and, in particular, to a server (e.g., HSS) and a method for enabling the server to influence the invoking of a service (e.g., IMS service) provided by an application server (e.g., IMS application server) to a user-user equipment (UE).

BACKGROUND

The following abbreviations are herewith defined, at least some of which are referred to within the following description of the prior art and the present invention.
3GPP 3rd Generation Partnership Project
CAMEL Customized Applications for Mobile Networks Enhanced Logic
CS Circuit Switched
CSCF Call Session Control Function
GUP Generic User Profile
HSS Home Subscriber Server
IP Internet Protocol
IP-CAN IP Connectivity Access Network
IM IP Multimedia
IMS IP Multimedia Subsystem
LTE Long Term Architecture
PS Packet Switched
PPA Push-Profile-Answer
PPR Push-Profile-Request
SAA Server-Assignment-Answer
SAR Server-Assignment-Request
S-CSCF Serving CSCF
SDP Session Description Protocol
SIP Session Initiation Protocol
UE User Equipment
UML Unified Modeling Language
URI Uniform Resource Identifier
WLAN Wireless Local Area Network Referring to FIG. 1 (PRIOR ART), there is a diagram illustrating a 3GPP network 100 which has a traditional HSS 102 that is coupled to a CS domain 104, a PS domain 106 and an IM CN subsystem 108. The 3GPP network 100 is described in detail within the 3GPP TS 29.228 V7.5.0 entitled "3rd Generation Partnership Project; Technical Specification Group Core Network and Terminals; IP Multimedia (IM) Subsystem Cx and Dx Interfaces; Signalling Flows and Message Contents (Release 7)", dated March 2007 (the contents of which are incorporated by reference herein). As such, those skilled in the art are familiar with the architecture and functionality of this particular 3GPP network 100. Thus, for clarity, only the HSS 102 and the IM CN subsystem 108 (in particular a CSCF 110 and an application server 112) which are relevant to the present discussion are discussed in detail herein while the other well known components like the GMSC, MSC/VLR, SGSN, GGSN, OSA SCS, IM-SSF etc. . . . are not discussed in detail within this document. The CSCF 110 is the entity within the IM CN subsystem 108 that is involved in establishing user call/sessions with UEs 114 (only one shown). The application server 112 is the entity within the IM CN subsystem 108 that provides an IMS service to the UE 114.

The HSS 102 has a master database 103 which stores information related to the users and their respective UEs 114 in the 3GPP network 100. For the sake of simplicity, user and user equipment are generally referred to as the same and have often been identified as UE 114 throughout the present document, so that the information stored in the master database 103 on a user basis is generally referred to as user data irrespective of whether such data is associated with the user or their respective user equipment. For instance, the HSS 102 incorporates the 2G/3G Core network HLR functions in addition to other functions related to accesses like the user control IP Multimedia Subsystem (IMS) functions, CS functions, PS functions, WLAN functions etc. . . . In particular, the HSS 102 supports the following functions: (1) mobility management; (2) user security information generations; (3) user security support; (4) service provisioning support; (5) call/session establishment support; (6) GUP data repository; (7) identification handling; (8) service authorization support; (9) access authorization; (10) application services support; and (11) CAMEL services support. Basically, the HSS 102 has become a privileged point in the 3GPP network 100 where many different accesses meet.

The traditional HSS 102 also has multiple tasks and one of those tasks is to handle the service profile 116 for the IMS UE 114 which receives an IMS service from the IM application server 112. For instance, the HSS 102 downloads the service profile 116 to a serving CSCF 110 (hereinafter S-CSCF and in particular the S-CSCF 110) assigned for serving the UE 114 when the UE 114 registers with the IM CN subsystem 108. The S-CSCF 110 then uses the service profile 116 to invoke the IMS service for the UE 114. The HSS 102 would also download the service profile 116 to the S-CSCF 110 whenever an operator administratively changes data related to the UE 114. A discussion about the contents of the traditional service profile 116 is provided next but for a more detailed discussion about the traditional service profile 116 reference is made to Annex B in the aforementioned 3GPP TS 29.228 V7.5.0

Referring to FIG. 2A (PRIOR ART), there is a diagram illustrating an outline of a UML model for the traditional service profile 116 that is currently specified in 3GPP TS 29.228 V7.5.0. As shown, the traditional service profile 116 has the following: (1) a Public Identification class 202; (2) a Core Network Service Authorization class 204; (3) an Initial Filter Criteria class 206; and (4) a Shared IFC Set class 208. The IFC class 206 is relevant to the present discussion because it contains the mechanisms that are used by the S-CSCF 110 to invoke the IMS service for the UE 114. Thus, the IFC class 206 is described in detail below while the Public Identification class 202, the Core Network Service Authorization class 204, and the Shared IFC Set class 208 will not be discussed in detail within this document.

Referring to FIG. 2B (PRIOR ART), there is a diagram illustrating an outline of the UML model of the IFC class 206 currently specified in 3GPP TS 29.228 V7.5.0. The IFC class 206 has zero to n IFC instances 206' (one shown) each of which is composed of zero or one instance of a Trigger Point class 210 and one instance of an Application Server class 212. Each IFC 206' has a priority attribute that indicates the priority of the filter criteria where the higher the priority number then the lower the priority of the filter criteria. For example, an IFC 206' with a higher value of priority number would be assessed after the IFC 206' with a smaller priority number has been assessed. Plus, each IFC 206' has a ProfilePartIndicator attribute that is an enumerated type, with possible values "REGISTERED and UNREGISTERED", which indicates if the respective filter is a part of the registered or unregistered user service profile 116.

The Trigger Point class 210 describes trigger points that are checked by the S-CSCF 110 to find out if the indicated application server 112 (for example) should be contacted or not to provide an IMS service to the UE 114. Each trigger point 210 is composed of 1 to n instances of the Service Point Trigger class 214 (hereinafter SPT or SPT class). Plus, each trigger point 210 is a boolean expression in Conjunctive or Disjunctive Normal form (CNF of DNF). In particular, each trigger point 210 has a ConditionTypeCNF attribute that defines how the set of corresponding SPTs 214 are expressed, i.e. either an ORed set of ANDed sets of SPT statements or an ANDed set of ORed sets of statements. These combinations are termed, respectively, Disjunctive Normal Form (DNF) and Conjunctive Normal Form (CNF). Both DNF and CNF forms can be used. In the absence of a trigger point class 210, this would indicate an unconditional triggering of the indicated application server 112.

The Application Server class 212 indicates the application server 112 (for example), which is contacted, if the trigger points 210 and SPTs 214 are met. The Application Server class 212 has a ServerName attribute which contains the SIP URL of the application server 112 (for example). The Application Server class 212 also has a Default Handling attribute which indicates whether the dialog with the UE 114 should be released if the application server 112 could not be reached. The Default Handling attribute is enumerated and can take the values: SESSION_CONTINUED or SESSION_TERMINATED. In addition, the Application Server class 212 contains zero or one instance of a Service Information class 216. The Service Information class 216 has a ServiceInfo attribute and allows the download of information to the S-CSCF 110 where the downloaded information is to be transferred transparently to an application server 112 when the trigger points 210 of the corresponding IFC 206' are satisfied.

Referring to FIG. 2C (PRIOR ART), there is a diagram illustrating an outline of an UML model of the SPT class 214 currently specified in 3GPP TS 29.228 V7.5.0. The SPT class 214 has one to n SPT instances 214' (one shown) where each SPT 214' has a Group attribute that allows the grouping of SPTs that will configure the sub-expressions inside a CNF or DNF expression. For instance, in the following CNF expression (A+B)·(C+D), A+B and C+D would correspond to different groups. In CNF, the Group attribute identifies the ORed sets of SPT instances 214'. If the SPT 214' belongs to different ORed sets, then that SPT 214' can have more than one Group value assigned. At least one Group is assigned for each SPT 214'. In DNF, the Group attribute identifies the ANDed sets of SPT instances 214'. If the SPT 214' belongs to different ANDed sets, then that SPT 214' can have more than one Group value assigned. At least one Group is assigned for each SPT instance 214'. Plus, each SPT 214' also has a ConditionNegated attribute which defines whether the corresponding instance is negated (i.e. NOT logical expression). Plus, each SPT 214' has a RegistrationType attribute which is relevant only to the SIP Method 216 (discussed below) that has a value of "REGISTER" (note: the support of the RegistrationType attribute is optional in the HSS 102 and in the S-CSCF 110).

Moreover, each SPT 214' includes the following: (1) Request-URI class 218; (2) SIP Method class 216; (3) SIP Header class 220; (4) Session Case class 222; and (5) Session Description class 224. The Request-URI class 218 contains a RequestURI attribute and defines a SPT for the Request-URI. The SIP Method class 216 contains a Method attribute and defines a SPT for the SIP method. The SIP Header class 220 contains a Header attribute and a Content attribute which define a SPT for the presence or absence of any SIP header or for the content of any SIP header. The Session Case class 222 is an enumerated type, with possible values "Originating", "Terminating_Registered", "Terminating_Unregistered", "Originating_Unregistered" which indicate whether the filter should be used by the S-CSCF 110 handling the Originating, Terminating for a registered end user 114, Terminating for an unregistered end user 114, or Originating for an unregistered end user 114. The Session Description Information class 224 has a Line attribute and a Content attribute which define a SPT for the content of any SDP field within the body of a SIP Method.

In view of FIGS. 2A-2C (PRIOR ART), it can be seen that the service profile 116 has one or more IFCs 206' which are the mechanism that is downloaded to and then used by the S-CSCF 110 in the IMS Core 108 to invoke an IMS service for the UE 114 (only one shown). Basically, the IFCs 206' identify the particular IMS application server 112 that has to be invoked by the S-CSCF 110 and what must be done if that particular INS application server 112 is not available. In addition, the IFCs 206' include one or more SPTs 214 which specify under which conditions the identified IMS application server 112 shall be involved in a SIP session such that the IMS service can be invoked for the particular UE 114.

In particular, the S-CSCF 110 when handling a SIP request for the UE 114 (or the IMS application server 112 on behalf of the UE 114) goes through the list of prioritized IFCs 206 and the corresponding SPTs 214 within the service profile 106. And, when the conditions in the IFCs 206 and the corresponding SPTs 214 are satisfied according to the information in the SIP request then the S-CSCF 110 contacts the IMS application server 112 that was indicated in the Application Server class 212 to invoke the SIP request. Generally speaking, the IFCs 206 are related to SIP messages and SIP procedures and, consequently, the conditions specified in the corresponding SPTs 214 are also related to the contents of the SIP messages and the SIP procedures. This can be seen by the fact that the SPTs 214 which have been standardized to date include the Request-URI 218, the SIP Method 216 (e.g. INVITE), the SIP Header 220 (for the presence or absence of any SIP header or for the content of any SIP header), the Session Case 222 (an enumerated type, with possible values "Originating", "Terminating_Registered", "Terminating_Unregistered", "Originating_Unregistered"), and the Session Description 224 (for the content of any SDP field located within the body of a SIP Method) (note: SDP is a format for describing streaming media initialization parameters and is discussed in detail within IETF's RFC 4566).

However, there is high interest today to take into account other information and not only SIP information that is related to the specific SIP request which is received by the S-CSCF 110 to invoke an IMS service for the UE 114. For example, today it is not possible to take into account the CS status (GSM attached, etc. . . . ) of the UE 114 to decide whether one IMS application server 112 or another IMS application server should be involved in the SIP request. Accordingly, there has been and is a need to address this shortcoming and other shortcomings with the current state-of-the-art when invoking an IMS service for a particular UE. This need and other needs are satisfied by the present invention.

SUMMARY

In one aspect, the present invention provides a server that includes a database that stores a service profile for the user, where the service profile has a number of filter criteria, wherein at least one includes: (1) a first trigger point and at least one first service point trigger that specifies one or more conditions which when satisfied will be downloaded to and checked by a remote control function before a service is invoked for the user-user equipment; and (2) a second trigger point and at least one second service point trigger that specifies one or more conditions which are checked against internally stored data (e.g., non-SIP related data) associated with the user-user equipment and which need to be satisfied before the service profile with the filter criteria including the first trigger point and the at least one first: service point trigger is downloaded to and checked by the remote control function to invoke the service for the user-user equipment. This scheme is desirable since the server can use internally stored non-SIP related information when invoking a service for the user-user equipment. Plus, this scheme is desirable since the server can influence the invoking of the service by using the second trigger point and the internally stored non-SIP related data to determine if the first trigger point should be downloaded in the first place to the remote control function which then may invoke the service for the user-user equipment.

In another aspect, the present invention provides a method for enabling a server to influence an invoking of a service to a user-user equipment. The method comprising the steps of: (a) creating a service profile for the user-user equipment, where the service profile has a number of filter criteria, wherein at least one includes: (1) a first trigger point and at least one first service point trigger that specifies one or more conditions which have to be satisfied before a remote control function can invoke the service for the user-user equipment; and (2) a second trigger point and at least one second service point trigger that specifies one or more conditions which will be checked against internally stored data that is associated with the user-user equipment; (b) pre-filtering the filter criteria by determining if there is a match between the one or more conditions in the at least one second service point trigger and the internally stored data that is associated with the user-user equipment; (c) if there is a match, then downloading the service profile with the filter criteria including the first trigger point and the at least one first service point trigger to the remote control function, wherein the remote control function then needs to confirm that the one or more conditions of the at least one first service point trigger are satisfied before invoking the service for the user-user equipment; and (d) if there is not a match, then preventing the download of the service profile with the filter criteria including the first trigger point and the at least one first service point trigger to the remote control function.

In yet another aspect, the present invention provides a 3GPP network which includes a HSS, a S-CSCF, and an IMS Application Server, wherein the HSS influences an invoking of an IMS service provided by said IMS Application Server to a user-user equipment by: (a) creating a service profile for the user-user equipment, where the service profile has an Initial Filter Criteria (IFC) that includes: (1) a first trigger point and at least one first service point trigger that specifies one or more conditions which have to be satisfied before the S-CSCF can invoke the IMS service for the user-user equipment; and (2) a second trigger point and at least one second service point trigger that specifies one or more conditions which will be checked against internally stored data that is associated with the user-user equipment; (b) pre-filtering the IFC by determining if there is a match between the one or more conditions in the at least one second service point trigger and the internally stored data that is associated with the user-user equipment; (c) if there is a match, then downloading the service profile with the IFC including the first trigger point and the at least one first service point trigger to the S-CSCF, wherein the S-CSCF then has to confirm that the one or more conditions of the at least one first service point trigger are satisfied before invoking the IMS Application Server to provide the IMS service for the user-user equipment; and (d) if there is not a match, then preventing the download of the service profile with the IFC including the first trigger point and the at least one first service point trigger to the S-CSCF.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 4A-4C are three diagrams illustrating an outline of an UML model for an exemplary service profile that is configured in accordance with the present invention;

FIG. 5 is a signal flow diagram illustrating how the enhanced HSS can be used during the registration of a UE in accordance with the present invention;

FIG. 6 is a signal flow diagram illustrating how the enhanced HSS can be used during a termination session towards a UE in accordance with the present invention; and FIG. 7 is a signal flow diagram illustrating how the enhanced HSS can be used when there is a change in the data for the UE in accordance with the present invention.

DETAILED DESCRIPTION

Figure 3:
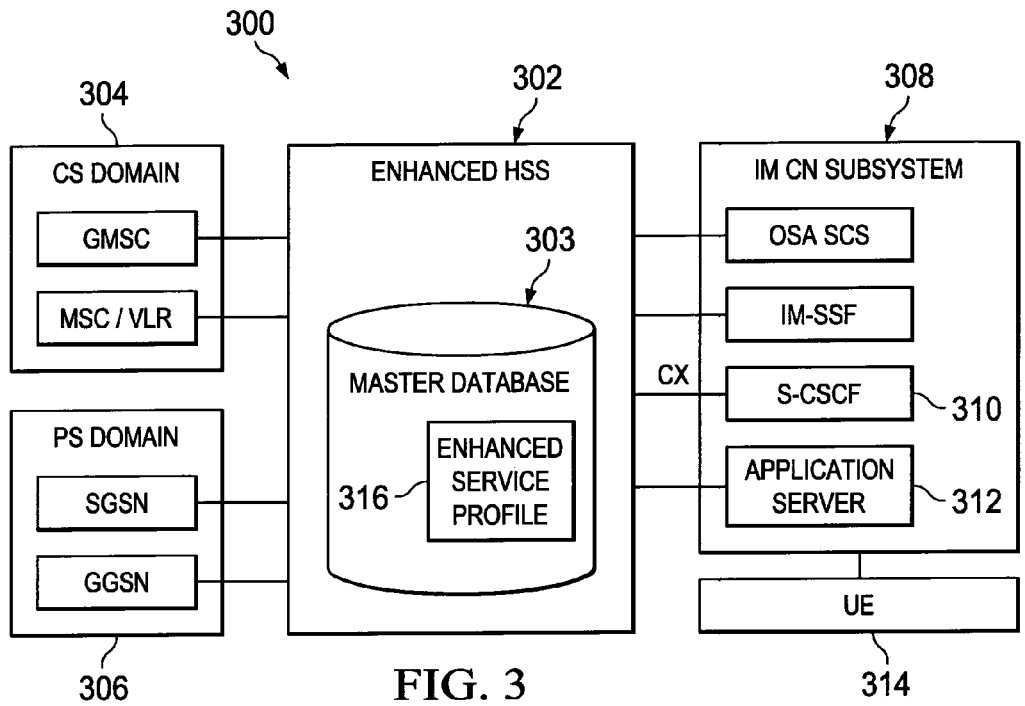
FIG. 3 is a diagram illustrating a 3GPP network which has an enhanced HSS that is coupled to a CS domain, a PS domain and an IM CN subsystem in accordance with the present invention.

Referring to FIG. 3, there is a diagram illustrating a 3GPP network 300 which has an enhanced HSS 302 that is coupled to a CS domain 304, a PS domain 306 and an IM CN subsystem 308 in accordance with the present invention. The enhanced HSS 302 has a master database 303 for UEs 314 (only one shown) which supports HLR functions as well as IMS related subscription and subscriber data. The enhanced HSS 302 also handles a service profile 316 for each IMS UE 314 and, during registration of a given UE 314, submits the corresponding service profile 316 towards an S-CSCF 310

(located in IM CN subsystem 308) that is assigned to serve the given UE 314. For the sake of simplicity, user and user equipment are generally referred to as the same and have often been identified as UE 314 throughout the present document, so that the information stored in the master database 303 on a user basis is generally referred to as user data irrespective of whether such data is associated with the user or their respective user equipment.

As in the past, the enhanced HSS 302 still handles a service profile 316 that includes the traditional IFCs which are used by the S-CSCF 310 to invoke IMS services executed in an IMS Application Server 312 for the user and their respective UE 314. Each traditional IFC, in a service profile 316 for a given UE 314, includes a plurality of SPTs that specify conditions that need to be satisfied before the S-CSCF 310 involves an IMS application server 312 in the invocation of IMS services for the given UE 314. The traditional IFC's are related to SIP messages and SIP procedures and, consequently, the conditions specified by corresponding SPT's are also related to the contents of the SIP messages and the SIP procedures. However, the service profile 316 has also been changed so that other information and not only SIP information that is related to a specific SIP request received by the S-CSCF 110 can be taken into account to influence the invoking of an IMS service for a given UE 314. For example, the other information can include data such as whether or not the CS status is active for the given UE 314, the IP-CAN where the given UE 314 has accessed the IMS network 208, the type of PS network 306 accessed by the given UE 314 etc. . . . The enhanced HSS 302 has access to this non-SIP related information since it is the master database for the 3GPP network 300.

In particular, the enhanced HSS 302 in accordance with the present invention provides for a service profile 316 which has an enhanced IFC package that, in addition to the traditional IFC's (including SIP-related SPTs), further includes what are called herein as HSS-Trigger Points (HSS-TPs). Each HSS-TP includes pre-filter conditions that are checked by the enhanced HSS 302 against relevant subscriber data (e.g., non-SIP related information) to determine which if any of the IFC's configured for the given UE 314 will be downloaded and further evaluated by the assigned S-CSCF 310.

A detailed discussion is provided below to explain how the service profile 316 is expanded to include the new HSS-TPs and then a discussion is provided to explain how the enhanced HSS 302 operates to influence the invoking of an IMS service for a given UE 314 by using the new HSS-TPs to determine which IFCs in the service profile 316 will be downloaded to the assigned S-CSCF 310.

Figure 1:
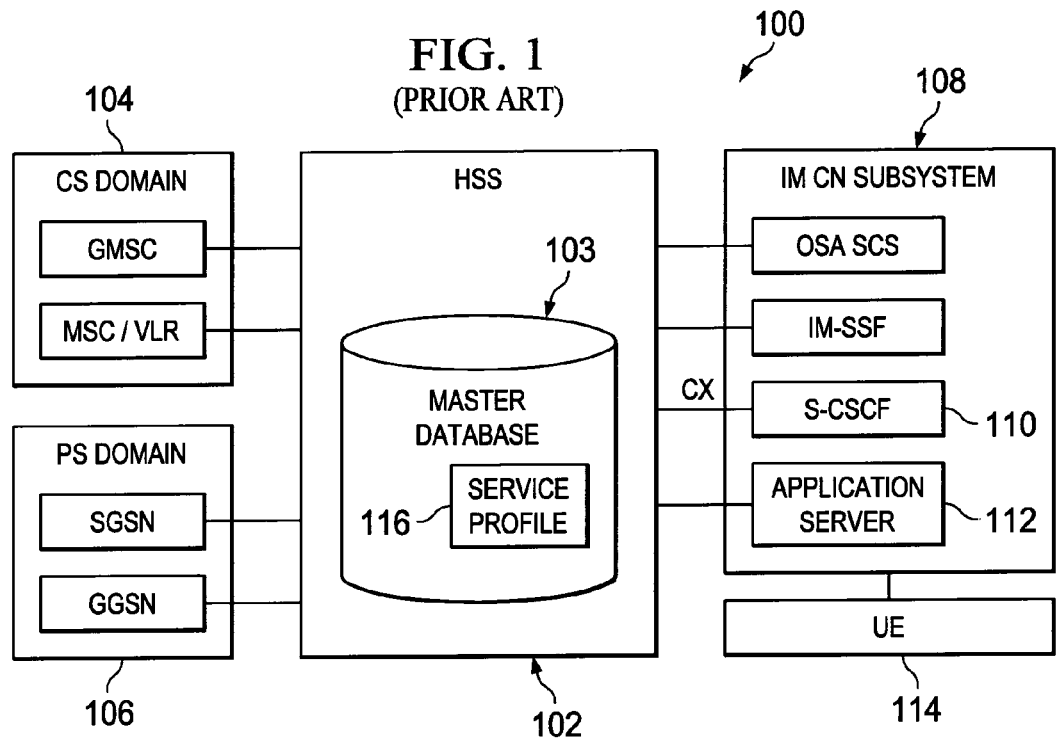
FIG. 1 (PRIOR ART) is a diagram illustrating a 3GPP network which has a traditional HSS coupled to a CS domain, a PS domain and an IM CN subsystem as currently specified in 3GPP TS 29.228 V7.5.0.
Figure 2A:
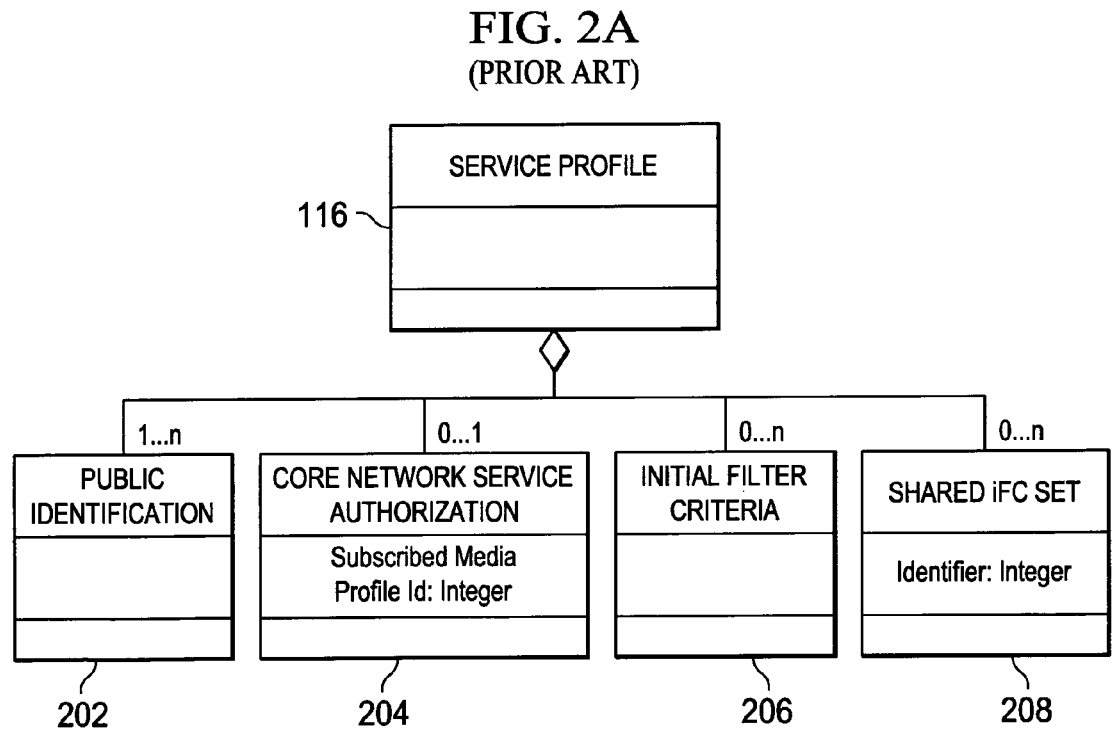
FIGS. 2A-2C (PRIOR ART) are diagrams illustrating an outline of a UML model for the traditional service profile that is currently specified in 3GPP TS 29.228 V7.5.0.
Figure 4A:
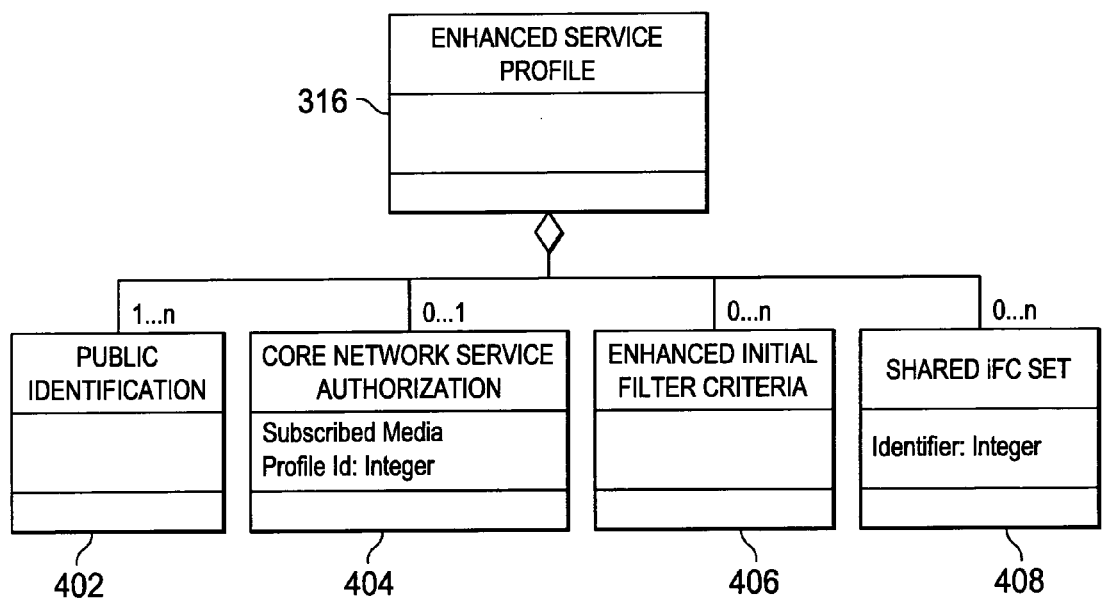

Referring to FIGS. 4A-4C, there are three diagrams illustrating an outline of an UML model for an exemplary service profile 316 that is configured in accordance with the present invention. FIG. 4A illustrates a high level of the exemplary service profile 316 which has the following: (1) a Public Identification class 402; (2) a Core Network Service Authorization class 404; (3) an enhanced Initial Filter Criteria class 406; and (4) a Shared IFC Set class 408. The service profile 316 includes the enhanced IFC class 406 which is described in detail below and also uses the previously standardized Public Identification class 402, the Core Network Service Authorization class 404, and the Shared IFC Set class 408 (compare to FIG. 2A).

FIG. 4B is a diagram illustrating an outline of the UML model of the enhanced IFC class 406 in accordance with the present invention. The enhanced IFC class 406 has zero to n IFC instances 406' (one shown) each of which has a priority attribute that indicates the priority of the filter criteria where the higher the priority number is then the lower the priority of the filter criteria. For example, an IFC 406' with a higher value of priority number would be assessed after the IFC 406' with a smaller priority number has been assessed. Plus, each IFC 406' has a ProfilePartIndicator attribute that is an enumerated type, with possible values "REGISTERED and UNREGISTERED, which indicates if the respective filter is a part of the registered or unregistered user service profile 316.

Figure 2B:
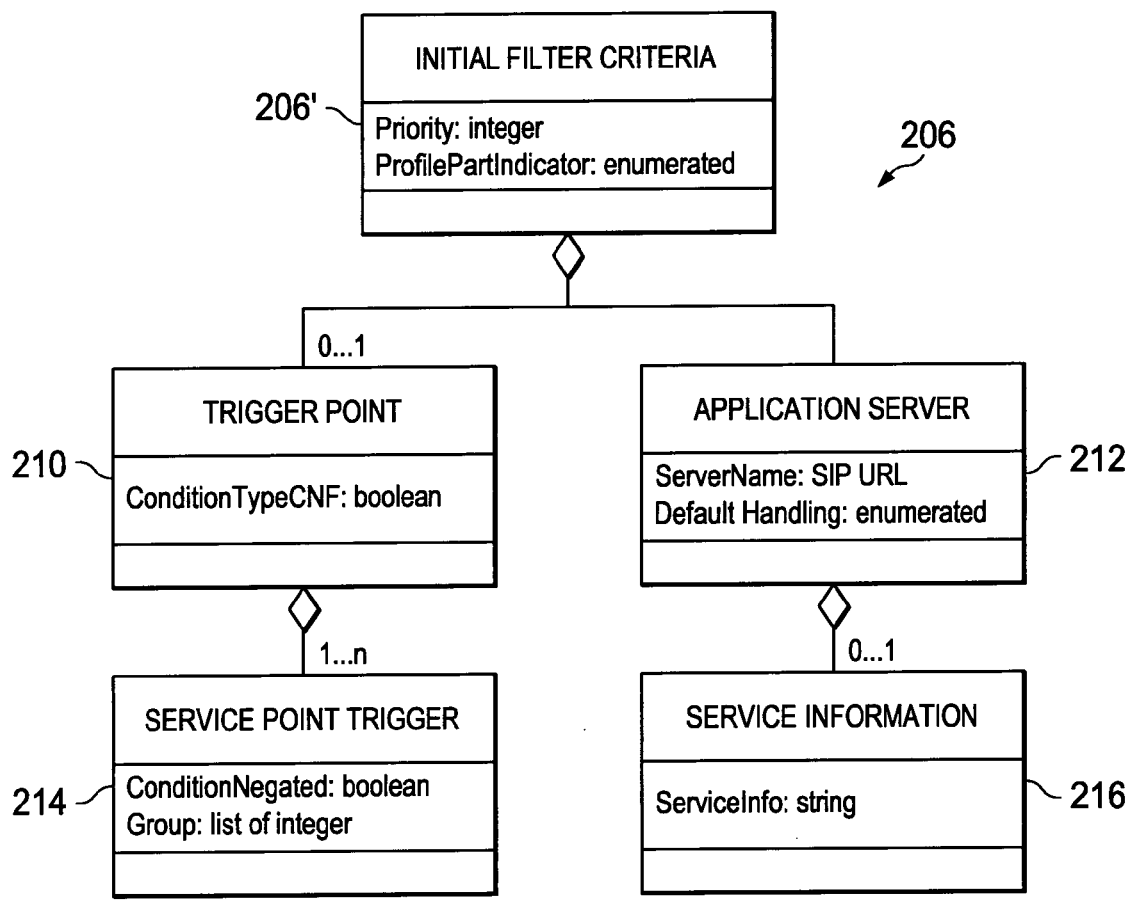
Figure 2C:
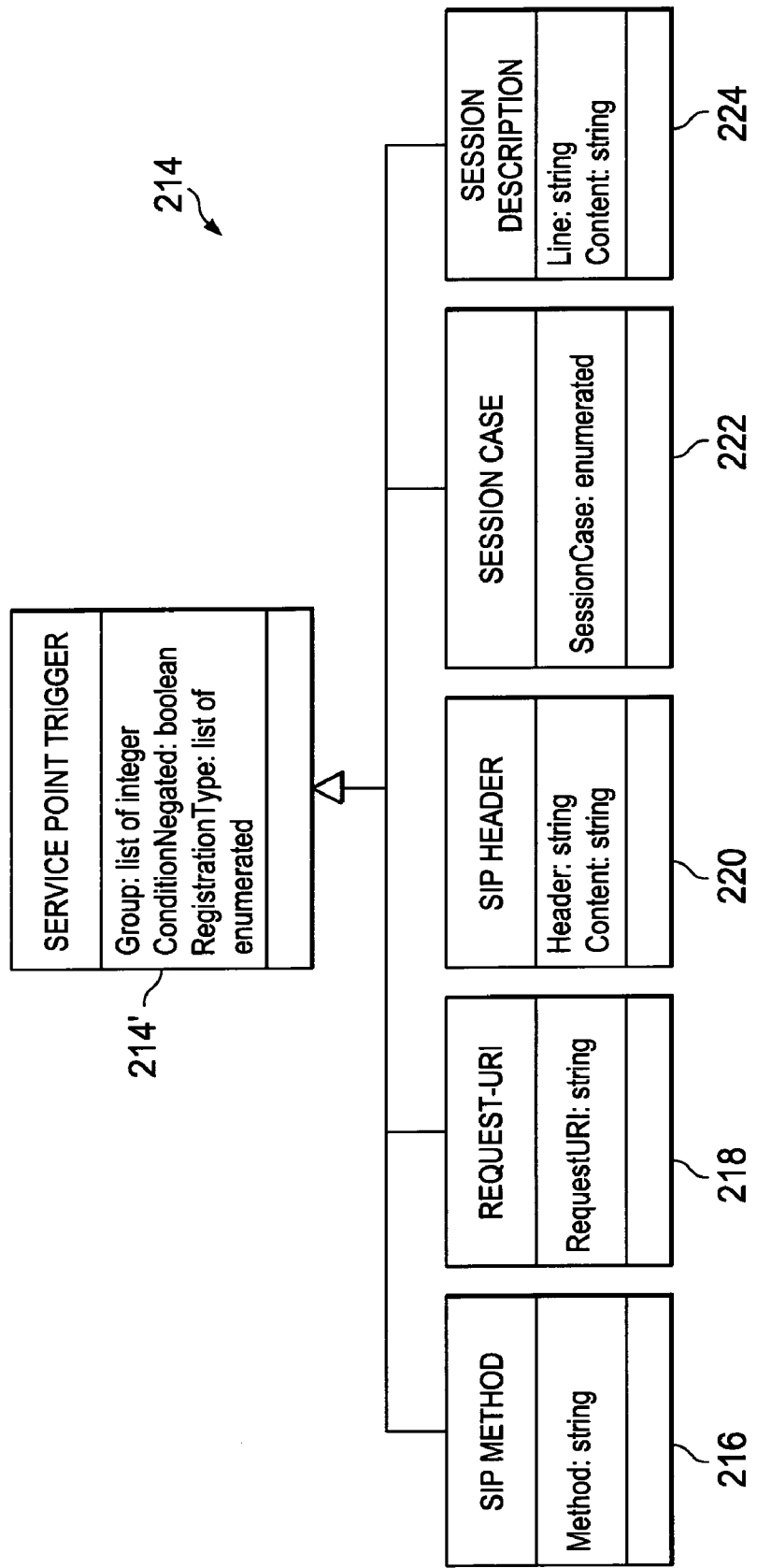

In addition, each IFC instance 406' is composed of zero or one instance of a Trigger Point class 410, one instance of an Application Server class 412, and one instance of a HSS-trigger point 414 including one or more HSS-owned SPT(s) 416. In particular, each IFC 406' has the standardized Trigger Point class 410 (including the corresponding SPT 418), the standardized Application Server class 412 (including the corresponding Service Information 417), and the new HSS-trigger point 414 which has the corresponding HSS-owned SPTs 416 (compare to FIG. 2B). The SPT 418 has one to n SPT instances 418' one of which is shown in detail in FIG. 4C and includes the following: (1) Request-URI class 420; (2) SIP Method class 422; (3) SIP Header class 424; (4) Session Case class 426; and (5) Session Description class 428 (compare to FIG. 2C).

As shown in FIG. 4B, the HSS-trigger point 414 is composed of 1 to n instances of the HSS-owned SPTs 416. Plus, each HSS-trigger point 414 is a boolean expression in Conjunctive or Disjunctive Normal form (CNF of DNF). More specifically, each HSS-trigger point 414 has a Condition-TypeCNF attribute that defines how the set of corresponding HSS-owned SPTs 416 are expressed, i.e. either an ORed set of ANDed sets of SPT statements or an ANDed set of ORed sets of statements. These combinations are termed, respectively, Disjunctive Normal Form (DNF) and Conjunctive Normal Form (CNF). Both DNF and CNF forms can be used.

In operation, the enhanced HSS 302 during UE 314's registration (for example) checks each IFC 406' and their corresponding HSS-trigger point 414 and associated HSS-owned SPTs 416 to determine if the corresponding Trigger point class 410 and Application Server class 412 will be downloaded to the S-CSCF 310. In particular, the enhanced HSS 302 has an evaluation process that checks the conditions stated in the HSS-owned SPTs 416 against internally stored non-SIP related user data. If there is a match, then the enhanced HSS 302 downloads the service profile 316 with the corresponding IFC 406' (absent the HSS-trigger point 414 and the associated HSS-owned SPTs 416) to the S-CSCF 310. If there is not a match, then the enhanced HSS 302 downloads the service profile 316 without the corresponding IFC 406' to the S-CSCF 310. Upon receiving the service profile 316, the S-CSCF 310 goes through the received IFCs 406' and their corresponding SPTs 418 and when the conditions in the IFCs 406' and the corresponding SPTs 418 are satisfied according to the information in a pending SIP request then the S-CSCF 310 contacts the appropriate IMS application server 312 to invoke the SIP request and provides IMS service to the UE 314. In this way, the enhanced HSS 302 is able to influence the invoking of the IMS service provided by an IMS application server 312 to the UE 314.

As can be seen, the enhanced HSS 302 includes in each IFC 406' a combination of a new type of SPTs called HSS-owned SPTs 416 that are not downloaded to the S-CSCF 310 but instead are first evaluated in the enhanced HSS 302. In this evaluation process, the enhanced HSS 302 determines if the conditions in the HSS owned SPTs 416 are satisfied in view of non-SIP related information and if yes then the corresponding IFCs 406' will be downloaded to the S-CSCF 310 and if not then the corresponding IFCs 406' will not be downloaded to the S-CSCF 310. In one possible application, assume according to the HSS owned SPTs 416 of one IFC 406' that the UE 314 needs to be in CS status=GSM attach for that IFC 406' to apply, then only if that is the case, will that IFC 406' be sent down to the S-CSCF 310. If the UE 314 is not GSM attached, then from the IMS core perspective 308 that particular IFC 406' was never part of the user service profile 316. Some additional examples of non-SIP related data that can be used to check conditions in HSS-owned SPTs 416 include user data related to an IP-CAN accessed by the UE 314, the PS network 106 accessed by the UE 314, the user location over different accesses etc. It is important to remark that the enhanced HSS 302 is a privileged point in the 3GPP network 300 where the many different accesses meet, and so it already stores a lot of valuable information (non-SIP related information) about the UE 314 which could be used in the evaluation process.

The enhanced HSS 302 behavior where the HSS-owned SPTs 416 are evaluated using non-SIP related information is beneficial in many different IMS procedures. Several examples of which are as follows:

At user registration: the IFCs 406' having the HSS-owned SPTs 416 will be evaluated by the enhanced HSS 302, and downloaded to the S-CSCF 310 only if their conditions are met according to HSS's knowledge of the UE 314 (see FIG. 5).

At a terminating session towards a not registered user: The enhanced HSS 302 answer to a location information request will be such that the S-CSCF 310 assignment will proceed only if there is at least one IFC 406' left that is applicable to the user's "unregistered status" after the HSS-owned SPTs 416 have been evaluated (see FIG. 6).

At a change of user dynamic data relevant for HSS-owned SPTs 416 or at a change of the user service profile 316 by provisioning: The enhanced HSS 302 evaluation of HSS-owned SPTs 416 may lead to the download of the service profile 316 to the S-CSCF 310 only if there are any changes when compared with the previously downloaded user service profile 316 (see FIG. 7).

Referring to FIG. 5, there is a signal flow diagram illustrating how the enhanced HSS 302 can be used during the registration of a UE 314 in accordance with the present invention. The steps are as follows:

1. UE 314 (UE A) uses the VMSC to register in CS with the enhanced HSS 302.
2. UE 314 (UE A) starts an INS registration request with the S-CSCF 310.
3. The S-CSCF 310 sends a SAR message to the enhanced HSS 302.
4. The enhanced HSS 302 uses non-SIP related information to evaluate (or pre-filter) the HSS-owned SPTs 416 in the service profile 316 associated with UE 314. In this case, the UE 314 registration status in the CS access will be taken into account during the evaluation of the HSS-owned SPTs 416 in the service profile 316.
5. The enhanced HSS 302 downloads a SAA message (including UE 314's service profile 316 with applicable IFCs 406' based on the result of step 4) to the S-CSCF 310.
6. UE 314 (UE A) registers with the S-CSCF 310.

Referring to FIG. 6, there is a signal flow diagram illustrating how the enhanced HSS 302 can be used during a terminating session towards UE 314 in accordance with the present invention. The steps are as follows:

1. UE 314 (UE A) uses the VMSC to register in CS with the enhanced HSS 302.
2. UE B sends a SIP INVITE to the S-CSCF 310 to establish a session with UE 314. More precisely, this SIP INVITE message is not directly submitted from UE B towards the S-CSCF 310 but is rather submitted through other network nodes that have not depicted for the sake of simplicity, since they are not relevant to the present discussion.
3. The S-CSCF 310 sends a SAR message to the enhanced HSS 302. At this time, UE 314 is not registered in IMS but is attached to CS (step 1).
4. The enhanced HSS 302 uses non-SIP related information to evaluate (or pre-filter) the HSS-owned SPTs 416 in the service profile 316 associated with UE 314. In this case, the UE 314 registration status in the CS access will be taken into account during the evaluation of the HSS-owned SPTs 416 in the service profile 316.
5. The enhanced HSS 302 downloads a SAA message (including UE 314's service profile 316 with applicable IFCs 406' based on the result of step 4) to the S-CSCF 310. This service profile 316 will be used to establish a session between UE B and UE 314.

Note: there is another possible outcome in this termination session case which is that, after the HSS-owned SPTs have been evaluated (step 4), there is not even one IFC 416' left that is applicable to the UE 314 when in "unregistered status". If this is the case, then the enhanced HSS 302 answer to the received request (step 5) will indicate this and the session establishment will not progress.

Referring to FIG. 7, there is a signal flow diagram illustrating how the enhanced HSS 302 can be used when there is a change in the data for the UE 314 in accordance with the present invention. The steps are as follows:

1. UE 314 (UE A) uses the VMSC to register in CS with the enhanced HSS 302.
2. UE 314 (UE A) starts an IMS registration request with the assigned S-CSCF 310.
3. The S-CSCF 310 sends a SAR message to the enhanced HSS 302.
4. The enhanced HSS 302 uses non-SIP related information to evaluate (or pre-filter) the HSS-owned SPTs 416 in the service profile 316 associated with UE 314. In this case, the UE 314 registration status in the CS access will be taken into account during the evaluation of the HSS-owned SPTs 416 in the service profile 316.
5. The enhanced HSS 302 downloads a SAA message (including UE 314's service profile 316 with applicable IFCs 406' based on the result of step 4) to the S-CSCF 310.
6. UE 314 (UE A) registers with the S-CSCF 310.
7. UE 314 (UE A) detaches from CS which means that the UE 314 status has changed relative to the CS status that was stored in the enhanced HSS 302 and used in step 4.
8. The enhanced HSS 302 re-evaluates the HSS-owned SPTs 416 in UE 314's service profile 316 because the UE 314 status relative to CS attachment had changed from attached CS to detached CS.
9. The enhanced HSS 302 downloads a PPR message (including UE 314's service profile 316 with applicable IFCs 406' (if any) based on the result of step 8) to the S-CSCF 310.
10. The S-CSCF 310 responds by sending a PPA message back to the enhanced HSS 302.

In an alternative embodiment, the mechanism is that new SPTs are added to the existing SPTs 418 so the trigger points 410 include conditions related to HSS stored user information, and that, instead of evaluating these new SPTs in the enhanced HSS 302 (as described above), the S-CSCF 310 receives all of this information in real-time download from the enhanced HSS 302. In particular, the enhanced HSS 302 would download to the S-CSCF 310 all of the IFCs and all of the non-SIP related user information (e.g. user CS status), so that this non-related SIP information can be considered by the S-CSCF 310 during the IFC evaluation. However, this alternative embodiment would have some drawbacks:

1. It would require additional parameters both in the user service profile 316 but also on the Cx (see FIG. 3), which implies a high effort to get this particular embodiment standardized.
2. The operators will most likely want to make use of other information related to user status and location on other accesses and not just for IMS access. If this happens, then this particular embodiment would also need a standardization effort for each of these different accesses.
3. The particular embodiment is not optimized for the Cx signaling or the S-CSCF 310 storage because (for example):
   The HSS 302 would be, in some cases, informing the S-CSCF 310 about user data and user data changes that are not applicable to a specific user.
   The HSS 302 would be, in some cases, downloading IFCs to the S-CSCF 310 that may not apply at all during the registration life of the user.
   The non-SIP related user data stored in the HSS 302 would have to be duplicated, as it now would need to be downloaded and synchronized in the S-CSCF 310.

In comparison, the first embodiment of the present invention where the enhanced HSS 302 does not download the non-SIP related to the S-CSCF 310 is considered a better solution since the IMS core 308 still takes into account the HSS stored user information albeit indirectly for service invocation while at the same time optimizing the usage of both the signaling interface Cx and the data storage (memory capacity) in the S-CSCF 310. Plus, the first embodiment of the present invention is desirable since the current 3GPP standards specify which HSS-owned information the vendors need to support to state compliance with a specific release. Thus, the first embodiment of the present invention enables vendor differentiation where particular vendors can create their own HSS-Owned SPTs 416 without interoperability problems and without any additional standardization since the HSS-Owned SPTs 416 would only be known to the enhanced HSS 302.

In summary, it should be appreciated that the first embodiment of the present solution discussed herein provides an efficient and extensible mechanism that allows HSS stored user information (both user dynamic but also user provisioned data) to be taken into account during the IFC evaluation process, and in this way influence the invoked services for the corresponding user. The enhanced HSS does this by adding HSS-owned SPTs to the IFCs information and performing a pre-filter of the IFCs themselves based on non-SIP related user data that is also stored in the HSS. As a result of this pre-filter step, the IFC will or will not be downloaded to the S-CSCF. In this way, the HSS is able to influence the invoked IMS services that are provided to a user by using stored user data.

Although several embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as set forth and defined by the following claims.

The invention claimed is:

1. A server, comprising:
   a database that stores a service profile for a user-user equipment, where the service profile has a number of filter criteria wherein at least one includes:
      a first trigger point and at least one first service point trigger that specifies one or more conditions which when satisfied will be downloaded to and checked by a remote control function before a service is invoked for the user-user equipment; and
      a second trigger point and at least one second service point trigger that specifies one or more conditions which are checked against internally stored data associated with the user-user equipment and need to be satisfied before the service profile with the filter criteria including the first trigger point and the at least one first service point trigger is downloaded to and then checked by the remote control function to invoke the service for the user-user equipment.

2. The server of claim 1, wherein said at least one first service point trigger further includes:
   a request Uniform Resource Indicator (URI);
   a Session Initiation Protocol (SIP) Method;
   a Session Initiation Protocol (SIP) Header;
   a Session Case; or
   a Session Description.

3. The server of claim 1, wherein said internally stored data is non-Session Initiation Protocol (SIP) related data including:
   a Circuit Switch (CS) status of the user-user equipment;
   an IP Connectivity Access Network (IP-CAN) accessed by the user-user equipment; or
   a type of Packet Switch (PS) network accessed by the user-user equipment.

4. The server of claim 1, wherein the at least one second service point trigger has a boolean expression in Conjunctive Normal Form, CNF, or in Disjunctive Normal Form, DNF, that specifies the one or more conditions which are to be checked against the internally stored data associated with the user-user equipment.

5. A method for enabling a server to influence an invoking of a service to a user-user equipment, said method comprising the steps of:
   creating a service profile for the user-user equipment, where the service profile has a number of filter criteria wherein at least one includes:
      a first trigger point and at least one first service point trigger that specifies one or more conditions which have to be satisfied before a remote control function can invoke the service for the user-user equipment; and
      a second trigger point and at least one second service point trigger that specifies one or more conditions which will be checked against internally stored data that is associated with the user-user equipment;
   pre-filtering the filter criteria by determining if there is a match between the one or more conditions in the at least one second service point trigger and the internally stored data that is associated with the user-user equipment;
   if there is a match, then downloading the service profile with the filter criteria including the first trigger point and the at least one first service point trigger to the remote control function, wherein the remote control function then needs to confirm that the one or more conditions of the at least one first service point trigger are satisfied before invoking the service for the user-user equipment; and
   if there is not a match, then preventing the download of the service profile with the filter criteria including the first trigger point and the at least one first service point trigger to the remote control function.

6. The method of claim 5, wherein said pre-filtering step is performed when the user-user equipment registers with the remote control function.

7. The method of claim 5, wherein said pre-filtering step is performed when another user-user equipment attempts to terminate a session with the user-user equipment.

8. The method of claim 5, wherein said pre-filtering step is performed after provisioning the service profile of the user-user equipment.

9. The method of claim 5, wherein said pre-filtering step is performed after a change in the internally stored data associated with the user-user equipment.

10. The method of claim 5, wherein said server is a Home Subscriber Server, HSS, which is used within a 3GPP network.

11. The method of claim 5, wherein the filter criteria is an Initial Filter Criteria, IFC, which is used within a 3GPP network.

12. The method of claim 5, wherein said remote control function is a Serving Call Session Control Function, S-CSCF, which is used within a 3GPP network.

13. The method of claim 5, wherein said at least one first service point triggers further includes:
    a request Uniform Resource Indicator (URI);
    a Session Initiation Protocol (SIP) Method;
    a Session Initiation Protocol (SIP) Header;
    a Session Case; or
    a Session Description.

14. The method of claim 5, wherein said internally stored data is non-Session Initiation Protocol (SIP) related data including:
    a Circuit Switch (CS) status of the user-user equipment;
    an IP Connectivity Access Network (IP-CAN) accessed by the user-user equipment; or
    a type of Packet Switch (PS) network accessed by the user-user equipment.

15. The method of claim 5, wherein the at least one second service point trigger has a boolean expression in Conjunctive Normal Form, CNF, or in Disjunctive Normal Form, DNF, that specifies the one or more conditions which are to be checked against the internally stored data associated with the user-user equipment.

16. A 3GPP network, comprising:
    a Home Subscriber Server (HSS);
    a Serving Call Session Control Function (S-CSCF);
    an IMS Application Server, wherein the HSS influences an invoking of an IMS service provided by said IMS Application Server to a user-user equipment by:
        creating a service profile for the user-user equipment, where the service profile has a number of Initial Filter Criteria (IFC) wherein at least one includes:
            a first trigger point and at least one first service point trigger that specifies one or more conditions which have to be satisfied before the CSCF invokes the IMS service for the user-user equipment; and
            a second trigger point and at least one second service point trigger that specifies one or more conditions which will be checked against internally stored data that is associated with the user-user equipment;
        pre-filtering the IFC by determining if there is a match between the one or more conditions in the at least one second service point trigger and the internally stored data that is associated with the user-user equipment;
        if there is a match, then downloading the service profile with the IFC including the first trigger point and the at least one first service point trigger to the S-CSCF, wherein the S-CSCF then has to confirm that the one or more conditions of the at least one first service point trigger are satisfied before invoking the IMS Application Server to provide the IMS service for the user-user equipment; and
        if there is not a match, then preventing the download of the service profile with the IFC including the first trigger point and the at least one first service point trigger to the S-CSCF.

17. The 3GPP network of claim 16, wherein said at least one first service point trigger further includes:
    a request Uniform Resource Indicator (URI);
    a Session Initiation Protocol (SIP) Method;
    a Session Initiation Protocol (SIP) Header;
    a Session Case; or
    a Session Description.

18. The 3GPP network of claim 16, wherein said internally stored data is non-Session Initiation Protocol (SIP) related data including:
    a Circuit Switch (CS) status of the user-user equipment;
    an IP Connectivity Access Network (IP-CAN) accessed by the user-user equipment; or
    a type of Packet Switch (PS) network accessed by the user-user equipment.

19. The 3GPP network of claim 16, wherein the at least one second service point trigger has a boolean expression in Conjunctive Normal Form, CNF, or in Disjunctive Normal Form, DNF, that specifies the one or more conditions which are to be checked against the internally stored data associated with the user-user equipment.

* * * * *

UNITED STATES PATENT AND TRADEMARK OFFICE
CERTIFICATE OF CORRECTION

| | | |
|---|---|---|
| PATENT NO. | : 8,175,038 B2 | Page 1 of 1 |
| APPLICATION NO. | : 12/666759 | |
| DATED | : May 8, 2012 | |
| INVENTOR(S) | : Mas Rosique et al. | |

It is certified that error appears in the above-identified patent and that said Letters Patent is hereby corrected as shown below:

In Column 4, Line 29, delete "INS" and insert -- IMS --, therefor.

In Column 5, Line 19, delete "first:" and insert -- first --, therefor.

In Column 9, Line 46, delete "INS" and insert -- IMS --, therefor.

Signed and Sealed this
Twenty-third Day of October, 2012

David J. Kappos
*Director of the United States Patent and Trademark Office*